Feb. 23, 1954
R. PYZEL
2,670,193
CONTROLLING FLOW OF FLUIDIZED SOLIDS
Filed May 9, 1949
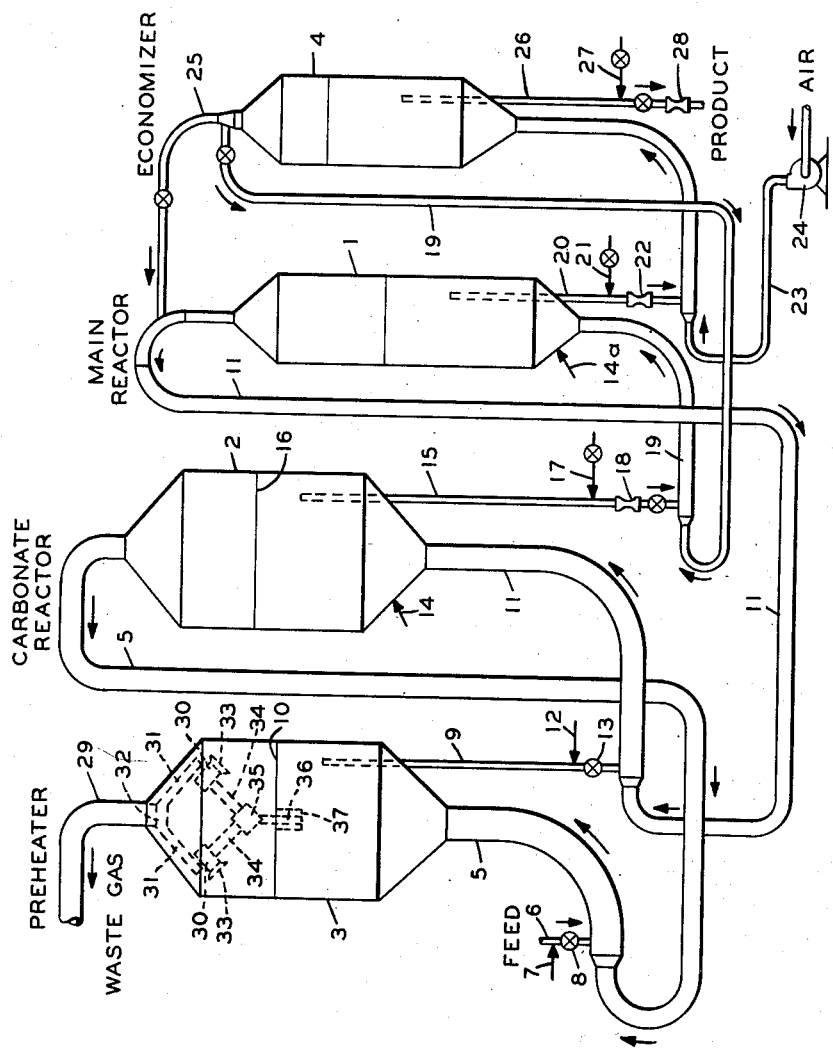
INVENTOR.
ROBERT PYZEL
BY E. F. Liebrecht
Edmond F. Shanahan
ATTORNEYS Patented Feb. 23, 1954

2,670,193

UNITED STATES PATENT OFFICE 2,670,193

CONTROLLING FLOW OF FLUIDIZED SOLIDS

Robert Pyzel, New York, N. Y., assignor to The M. W. Kellogg Company, Jersey City, N. J., a corporation of Delaware Application May 9, 1949, Serial No. 92,140

4 Claims. (Cl. 263—52)

This invention relates in general to chemical processes in which gases and finely divided solids are contacted by means of the so-called fluidized solid technique in which the gases are passed upwardly through a mass of powdered solids under conditions which cause the mixture to become "fluidized," i. e. to assume liquid-like properties. More particularly, the present invention is a method for controlling the flow of pseudo-liquid solids at very high temperatures, 2500° F., for example. The method involves withdrawing a downflowing stream of fluidized solids, passing said downflowing stream through an orifice of predetermined cross-section, introducing aerating gas into said downflowing stream above said orifice, and varying the rate of introduction of said aerating gas to vary the density of said downflowing stream and thereby the rate of flow of solids through said orifice. In a preferred form of the invention, the orifice is provided with a ceramic lining having a fixed interior dimension suitable for transferring solids at any rate within a predetermined desired range depending upon the pressure drop across the orifice. The rate of transfer of solids through the orifice is varied by varying the pressure head at the orifice inlet, which is in turn the function of the density of the fluidized solids within the downflowing stream above the orifice. The density of the fluidized stream above the orifice may be adjusted by varying the degree of aeration. The height of the downflowing stream above the orifice, sometimes referred to as the "standpipe stream," is proportionate to the range of flow rates which are desired. For any given fluidized solid there are certain minimum and maximum densities at which the material can be handled as a pseudo-liquid. For a given height of "standpipe stream" the range of pressures and therefore of flow are determined by these limits; and a greater flow rate (for a given orifice) requires a higher standpipe stream. On the other hand, if a certain minimum flow rate is desired, a minimum orifice size is required for a given standpipe height.

The invention is particularly useful in connection with the manufacture of Portland cement in accordance with the method described in my co-pending application S. N. 550,298, now Patent No. 2,469,989 entitled "Process of Forming Chemical Reaction Products and Metal Oxides" of which the present application is a continuation-in-part.

The method of the parent application requires the measured flow of various metallic oxide powders while at temperatures of 2500° F. Valves are not satisfactory means for varying or controlling the flow of powdered solids at such high temperatures. It will be apparent from the following description that the method of the present invention provides a means for controlling and varying the flow of hot solids which is particularly satisfactory in connection with the cement making process of the parent application.

The most important constituent of Portland cement is calcium silicate which is present in the usual commercial product in the form of tri-calcium silicate and also in the form of di-calcium silicate. Another important ingredient of Portland cement is tri-calcium aluminate, which is thought to impart setting properties to the cement.

Portland cement is made ordinarily from any raw materials which provide CaO, $SiO_2$ and $Al_2O_3$ in the desired proportions. In certain uses of Portland cement iron oxide is considered as a valuable ingredient, as is magnesia. Iron oxide serves somewhat as a replacement for $Al_2O_3$ but also imparts its own peculiar properties to the cement. Magnesia likewise may replace CaO in part but also imparts its own characteristic properties to the cement.

In the United States the principal raw material employed in the manufacture of Portland cement is cement rock which is an argillaceous limestone containing CaO, $SiO_2$ and $Al_2O_3$ in almost the proportions ordinarily desired in Portland cement. Small amounts of lime or clay may be added to make any necessary adjustment of the proportion of these oxides in the raw material. Another important raw material which is employed in the United States is marl which is an impure calcium carbonate containing clay and magnesia. This also is used in combination with clays or limestone to produce the desired proportions of the essential ingredients for the Portland cement. It is to be understood, however, that Portland cement may be produced from any raw materials containing the CaO, $SiO_2$ and $Al_2O_3$ which are regarded as the essential constituents of Portland cement. In previous commercial operations the raw materials are finely ground and burned in a rotary kiln into which they are introduced either as a powder or as a slurry. The raw materials are burned in the rotary kiln in the well-known manner and emerge as clinker which is then ground to produce the cement product.

It is an object of this invention to provide an improved process for treating the raw materials ordinarily employed in the production of hydraulic cement which requires a substantially lower expenditure of fuel than previous methods and which produces a cement product of greater uniformity than the product of previous processes. It is the general object of the invention to provide an improved process for reacting oxides of metals of group II, particularly alkaline earths, with oxides of metals of groups III and IV, such as silica and alumina, under conditions requiring the expenditure of a minimum amount of fuel and which facilitate the formation of a highly uniform product. Other objects and advantages of the invention will be apparent from the following description.

In accordance with the improved process of this invention the raw materials are formed into a fine powder, which may be finer than the powder previously employed in the rotary kiln method, and the powder is subjected to reaction conditions in a reactor while being maintained in a relatively dense pseudo-liquid condition in the reactor by the passage of a gas upwardly through the powder mass at the proper velocity. The powdered raw material may be charged to the reactor in the chemical form in which it is customarily charged to a rotary kiln or the powdered raw material may be subjected to a preliminary burning in a separate zone to convert the calcium carbonate to calcium oxide.

The heat necessary to sustain the reaction may be supplied with the stream of gas, or fuel may be introduced directly into the fluidized powdered mass and burned therein to provide the necessary heat. It is more economical of heat and conducive to the preparation of a uniform product to subject the raw material to a preliminary treatment in a separate chamber to convert the calcium carbonate to calcium oxide. It is characteristic of this invention that the reaction zone is maintained at a substantially uniform temperature throughout as a result of the circulation of the powdered particles throughout the fluidized mass of reactants. Consequently it is preferable to convert the calcium carbonate to calcium oxide in a separate preliminary treatment since this operation is best carried out at a temperature considerably lower than the temperature necessary for reacting the calcium oxide with silica and alumina to produce the hydraulic product. While such separate preliminary treatment is necessary only for that portion of the raw material containing calcium carbonate it will be found convenient ordinarily to subject the whole raw material to such preliminary treatment, since calcium carbonate ordinarily comprises the greater part of the raw material.

In accordance with the improved process the finely divided raw material, which may or may not have been treated previously to convert the carbonate to the oxide, is suspended in the reactor in an upwardly flowing gas stream as a dense, pseudo-liquid turbulent mass in which the powder particles circulate at a high rate to produce intimate mixing of the mass of reactants. The gas stream is passed upwardly through the mass at a velocity which is sufficient to maintain the reactants substantially in suspension in the gas stream. The velocity of the gas stream is maintained sufficiently low to maintain the greater part of the mass of reactants in a pseudo-liquid condition in which it exhibits many of the properties of a true liquid, particularly as to flowability and density. At the same time the velocity is maintained sufficiently high to produce in the relatively dense pseudo-liquid mass of finely divided reactants a highly turbulent motion of the particles whereby they circulate at a high rate throughout the pseudo-liquid mass.

The fluidized mass of reactants is quite dense, resembling in this respect a settled mass of the same material. The density of the fluidized mass may be not less than half that of the settled mass. While the dense turbulent reactant mass is said to be suspended in the gas stream this does not imply any movement of the mass as a whole along the path of flow of the gas stream. The mass of finely divided reactants is suspended in the gas stream but not entrained therein, although a portion of the suspended solid may be carried away from the dense fluidized mass by becoming entrained in the gas stream emerging from the dense pseudo-liquid mass.

The gas mixture is introduced into the reactor through an inlet in the bottom thereof whereby the gas stream passes upwardly through the mass of reactants to be maintained in a fluidized condition. Conveniently the inlet comprises one or more connections whose aggregate cross-sectional area is substantially less than the corresponding dimension of the space in which the fluidized mass of reactants is to be maintained. The gas stream thus passes into the reactor at a relatively high velocity which prevents the passage of solids out of the reactor against the entering gas stream. Inside the reactor the velocity of the gas stream decreases to the rate necessary to produce the desired degree of fluidization of the mass of reactants. For convenience the velocity of the gas stream in the reactor is given in terms of the theoretical velocity of the gas stream through an empty reactor and referred to hereafter as the superficial velocity. It is evident, however, that the velocity of the gas stream decreases to the superficial velocity only if the reactor is sufficiently larger than the volume of fluidized reactants to permit the maximum possible disengagement of the gas stream and the suspended solids. As the concentration of finely divided solids in the fluidized mass varies from a maximum at the bottom to a minimum at the top the linear velocity of the gas stream would normally decrease as it passes upwardly through the fluidized mass, in the absence of reaction. The extent of the variation in the density of the fluidized mass in the reactor is affected by the superficial velocity, the greatest variation in the density of the mass being observed at relatively high superficial velocity. The linear velocity of the gas stream may be affected also by the change in volume of the gas stream, as it passes up through the reactor, as a result of an increase in temperature of the gas stream and as a result of the formation of gases by the reaction.

If the reactor is somewhat larger than the volume occupied by the fluidized mass of solid reactants the solids in the reactor appear to be distributed in two visually distinct phases. The first of these is the relatively dense, pseudo-liquid mass of fluidized finely divided reactants, previously described, which occupies the lower portion of the reactor and comprises all but a minor proportion of the solids in the reactor. This phase is designated as the dense phase. The second phase, which occupies the upper part of the reactor, is a diffuse phase in which the concentration of solids is far less, and of a different order of magnitude, than the average concentration in the dense phase. The diffuse phase may be said to be a disengaging zone in which the solids lifted above the dense phase by the gas stream are disengaged therefrom to the extent that such solids are present in excess of the carrying capacity of the gas stream at the minimum velocity reached by the gas stream in the reactor. Between the dense phase of high concentration and the diffuse phase of low concentration there is a relatively narrow zone in which the concentration of solids changes in a short space from the high concentration of the dense phase to the low concentration of the diffuse phase. This zone has the appearance of an interface between two visually distinct phases.

While the invention includes within its scope the use of reactants of a sufficiently large particle size such that substantially no part of the reactants is carried by entrainment in the gas stream at the maximum superficial velocity, the preferred method of operation involves ordinarily the use of finely divided reactants and operating conditions such that a portion of the reactants is carried by entrainment in the gas stream at the superficial velocity. This results from the fact that finely divided reactants are desirable as presenting a greater ratio of surface to volume and, thus affording the maximum efficiency of reaction and maximum heat transfer between particles, and from the further fact that sufficient mixing of the mass of finely divided reactants ordinarily requires the use of superficial velocities which entrain a portion of the finely divided solids in the gas stream. In this preferred method of operation more settling is not sufficient to disengage all the solids from the gas stream emerging from the dense phase in the reactor. Hence it may be necessary to provide means to separate entrained solids from the gas stream emerging from the reactor.

The gas stream is withdrawn from the top of the reactor through an exit which is ordinarily of substantially smaller cross-sectional area than the reactor. This provides a high velocity outlet for the gas which is surrounded by an area in which the gas velocity accelerates. The nearer this zone of accelerating gas velocity is to the dense phase the greater is the concentration of solids in the gas stream entering the zone and the greater is the quantity of solids which is carried out of the reactor in the exit gas stream. This quantity approaches the carrying capacity of the high velocity exit gas stream when it is desired to maintain the upper level of the dense phase in the vicinity of the zone of accelerating velocity. In the preferred method of operation, however, the reactor is made sufficiently larger than the required volume of the dense fluidized mass of solids to provide a relatively large diffuse phase in which substantial disengagement of solids from the gas stream occurs by mere settling.

The operation is initiated by charging the reactor with a quantity of finely divided solid reactants which it is expected will be equivalent to the mass of solids maintained in the reactor in the dense phase. Thereafter the passage of the gas stream into the reactor and upwardly through the mass of solids is initiated at the velocity which fluidizes the mass i. e., converts it to the relatively dense pseudo-liquid condition involving highly turbulent motion of the particles. Alternatively the highly turbulent pseudo-liquid phase may be established in the reactor initially by flowing the gas stream through a substantially empty reactor and charging the finely divided solid reactants into the reactor at a rate greater than the carrying capacity of the gas stream at the superficial velocity imposed by the dimensions of the reactor. As a result of this excess loading of the gas stream the desired dense phase is gradually built up in the reactor. When the height of the dense phase in the reactor reaches the desired level the introduction of reactants into the reactor is carried on at a reduced rate or is stopped, in accordance with the desired method of operation.

If the reactants charged to the reactor are substantially free of carbonates, whereby there is no necessity for conversion of carbonates to oxides in the reactor, the net heat effect of the desired reactants is exothermic. In that case it is necessary only to heat the reaction mass to a temperature at which reaction is initiated. Thereafter the heat of reaction must be absorbed to avoid overheating the mass of reactants. The heat of reaction may be absorbed by the gas stream and the solid reactants, which may be introduced into the reactor at temperatures substantially lower than the reaction temperature level and which are necessarily withdrawn from the reactor at approximately the reaction temperature level. It is a feature of the improved method of operation that the reaction mass is maintained substantially at a uniform temperature regardless of the heating and cooling means applied to it and regardless of the introduction and withdrawal of solid reactants and gas. It is necessary only to balance the heat absorption by these means against the exothermic heat of reaction and any supplementary heating means to maintain the entire fluidized mass of reactants at a desired uniform reaction temperature level.

If the reactants charged to the reactor contain a substantial proportion of carbonates, whereby it is necessary to convert such carbonates to oxide in the reactor with the evolution of carbon dioxide the net heat effect of the reactions may be endothermic. In that case it is necessary continuously to supply substantial heat to the reactor to maintain the fluidized mass of reactants at the desired reaction temperature level. To supply heat to the reaction, or to effect the preliminary heating of the reaction mass to the reaction temperature, any suitable heating means may be employed. Conveniently fuel may be injected directly into the reactor and burned by means of oxygen in the gas stream. Such fuel may be in the form of a combustible gas, such as natural gas, a combustible liquid, such as petroleum oil, or finely divided solids, such as coal or coke. Alternatively combustion may be carried out in a separate chamber from which the hot gases pass into the reactor to effect simultaneous aeration and heating of the mass. The use of finely divided solids, injected directly into the reactor, is an efficient heating means in operations in which the ash resulting in such combustion can be tolerated in the product. For example, finely divided coal, which may be in a particle size approximating that of the reactants, is intimately mixed with the fluidized mass as the result of the high circulation rate of the particles thereof and is burned uniformly throughout the fluidized mass by oxygen contained in the gas stream employed for effecting fluidization. In this manner uniform heating of the mass is effected.

The use of the gas stream to effect combustion as well as to effect aeration introduces another factor to govern the volume of such gas introduced into the reactor. To produce the required amount of heating it may be necessary to employ a quantity of gas, such as air, in excess of the minimum amount necessary to effect fluidization, in order to supply sufficient oxygen for combustion in the reactor.

The mass of reactants may be maintained in the reactor at the desired reaction temperature without the addition or withdrawal of the reactants for a time sufficient to effect desired reaction. Thereafter the product may be withdrawn from the reaction and replaced with fresh reactants. Preferably, however, a small proportion of the fluidized mass of reactants is withdrawn continuously from the reactor and continuously replaced with fresh reactants. This proportion is regulated to provide an average residence time sufficient to effect complete reaction whereby the material continuously withdrawn from the reactor consists substantially completely of the desired reaction product.

In accordance with a preferred modification of the invention raw materials comprising substantial proportions of carbonates are treated in two reaction stages. In this method of operation the reactants are introduced into a first stage, maintained under the above described fluidized conditions, in which the temperature is maintained at the level necessary to convert the carbonates to oxides. Since this reaction is highly endothermic it is necessary to supply a substantial quantity of fuel continuously to this stage. The product of this operation then passes to a second treating stage, corresponding to the reaction zone described above, in which the fluidized mass is maintained at the temperature necessary to form the desired cement product. As the reactions occurring in thist stage are exothermic it is necessary to supply only a relatively small amount of heat to the reaction mass. The heat of reaction is absorbed in heating the entering reactants and gas stream.

To produce the turbulent pseudo-liquid condition in the dense phase it is desirable that at least a substantial proportion of the mass of reactants shall consist of particles whose free settling rate is less than the superficial velocity in the reactor, whereby such particles are capable of being entrained in the gas stream. The mass of reactants may consist advantageously of a mixture of particles varying in size from 40 to 400 microns (average diameter). However, particles of smaller or larger diameter may be present. The gas stream may be charged to the reactor at a rate corresponding to a superficial velocity of 0.1 to 10 feet per second, depending upon the degree of turbulence desired and on the necessity for extra oxygen for combustion purposes to maintain a highly fluidized mass of solids at a uniform temperature. A minimum superficial velocity of approximately 0.5 foot per second is necessary for most purposes and velocities between that figure and 1.5 feet per second will be found useful.

The gas employed for fluidization may be any gas which does not contain ingredients which effect undesired reactions in the reactor. Ordinarily air is highly satisfactory as it is substantially non-reactive with the reactants and contains oxygen which may be used to support any desired combustion in the reactor. It is evident, however, that any suitable gas may be employed.

The invention includes within its scope a process arrangement for handling the raw material and the product in a manner which is most economical of heat. This may include the provision of heat exchangers such as chambers in which the reactants are maintained in the finely divided fluidized condition and through which the finely divided solids flow in a continuous or semi-continuous manner. This arrangement, and the improved process in general, will be described further and in more detail by reference to the accompanying drawing which is a diagrammatic representation of apparatus for carrying out one modification of the improved process.

Referring to the drawing a main reactor 1 is provided for carrying out the treatment of a fluidized raw material substantially free of carbonates in the manner generally described above. A preliminary carbonate reactor 2 is provided for effecting a preliminary conversion of carbonates to oxides in the manner generally described above. A preheater 3 is provided for preheating the raw material charged to the carbonate reactor by contact with waste gases from the latter. An economizer 4 is provided to preheat the gas stream charged to the main reactor, or to the carbonate reactor, by contact thereof with the hot product of the process. In the specific modification of the invention illustrated by the drawing preheater 3 and economizer 4 are operated in a manner to maintain the reactants or product in a fluidized condition. It will be understood, however, that this is not necessary in accomplishing the functions of these parts of the process and that any equivalent heat saving means may be employed.

The waste gas stream from carbonate reactor 2 passes through line 5 to the bottom of preheater 3. The finely divided raw material, which may comprise a mixture of finely ground cement rock and clay or limestone, is introduced into preheater 3 by any suitable method. The finely divided reaction mass may be charged directly into preheater 3 through a suitable opening (not shown) prior to initiating the passage of the gas stream therethrough or preheater 3 may be charged with reactants through line 6 which connects line 5 with a suitable supply source. The finely divided reactants are supplied through line 6 to the gas stream passing through line 5 at the rate at which such solids can be carried by the gas stream upwardly into preheater 3. In this manner the formation of the dense fluidized mass is effected. When a sufficient volume of the dense phase has been produced in preheater 3 the rate of charging of fresh feed through line 6 is adjusted to correspond to the rate at which it is desired to transfer preheated raw material from preheater 3 to carbonate reactor 2.

The finely divided reactants are introduced through line 6 by any suitable means but preferably in the form of a mass which is maintained in a fluidized condition. To assist in maintaining this condition an aerating gas may be introduced into line 6 through line 7. This aerating gas may be any suitable gas such as air or waste gas or steam and may pass either upwardly in line 6 or downwardly therein or in both directions. A valve 8 is provided in line 6 to regulate the rate at which solids are introduced into line 5 from line 6. The section of line 5 between line 6 and preheater 3 may be enlarged in accordance with the increased volume resulting from the addition of solids and to obtain reduced velocity of the gas stream which may be desirable after the introduction of solids therein.

In preheater 3 the waste gas and the mass of raw materials is brought to a substantially uniform temperature by permitting a sufficient residence time of the solids in preheater 3. The preheated raw material may be withdrawn from preheater 3 in any suitable manner and from any point thereof for transfer to carbonate reactor 2. Conveniently, however, this is effected by means of a vertical standpipe 9 which extends upwardly into preheater 3 to a height substantially below the level of the interface at 10. Standpipe 9 connects at its lower end with line 11 through which hot gases from reactor 1 and economizer 4 are passed into the lower part of carbonate reactor 2. The fluidized preheated raw materials flow into the upper end of standpipe 9 and pass downwardly therethrough into line 11. The flow of such solids through standpipe 9 may be regulated and assisted by means of aerating gases introduced through line 12. A valve 13 is provided in standpipe 9 to regulate the flow of solids into line 11. Line 11 is suitably enlarged between standpipe 9 and carbonate reactor 2.

If valve 13 seems to wear excessively because of the temperature of flowing solids, its control functions may be eliminated by substituting a fixed orifice and regulating the flow in accordance with the method of the present invention, i. e. by varying the introduction of aerating gas through line 12. However, the need for this type of a control is not so great at the relatively low temperatures in the preheater 3 as in the carbonate reactor 2 and the main reactor 1. The valve may be retained but left fully opened while the orifice assumes the control functions during operation. In this way, the valve may be employed on occasion, at shut off for example, but is relieved of the constant wear which destroys it.

The hot gases passing through line 11 will further preheat the raw material to the temperature necessary to effect conversion of carbonates to oxide and may supply a part of the endothermic heat of reaction. The remainder of the heat of reaction is supplied by the introduction of fuel or by other heating means in accordance with the general methods described above. The introduction of fuel directly into carbonate reactor 2 by a pipe line or by a screw conveyer or by any other means is indicated diagrammatically at 14. The volume of gas introduced into carbonate reactor 2 through line 11 ordinarily is somewhat greater than the minimum necessary to effect fluidization of the mass of reactants therein since it is necessary ordinarily to supply additional oxygen to support combustion of the fuel supplied at 14. In any case the mass of reactants in carbonate reactor 2 is maintained in a highly turbulent condition in which the heat exchange between the various parts of the turbulent mass is highly efficient whereby the mass is substantially at a uniform temperature. The hot gases pass from the top of carbonate reactor 2 through line 5 which connects with the bottom of preheater 3 in which the waste gases are contacted with incoming fresh feed as a heat saving measure.

A standpipe 15, similar in operation to standpipe 9, is provided to withdraw reactants from carbonate reactor 2. The rate of withdrawal of reactants through standpipe 15 is adjusted to maintain an average residence time of the reactants in the carbonate reactor 2 substantially greater than the time necessary to effect the reaction. As a result the product withdrawn through standpipe 15 for transfer to main reactor 1 is substantially free of carbonates. The rate of withdrawal of reactants through standpipe 15 is adjusted also to maintain an interface 16 about half way up in carbonate reactor 2. This permits substantial disengagement of solids from the gas stream prior to passage of the latter to line 5.

It is important that the rate of withdrawal of the down-flowing solids be quickly and easily variable at all times during an operating run. Since most valves would be destroyed after a short period in use with solids at temperatures over 2,000° F., an orifice 18 is provided instead of a valve, and flow is regulated by varying the density of the standpipe stream in standpipe 15. The valve orifice may be determined by either making it sufficiently small so that the minimum desired flow is obtained when the standpipe stream is at a minimum density, i. e. aeration through pipe 17 is at a maximum consistent with satisfactory operation; or, if minimum flow is not critical, the orifice may be designed with reference to the maximum flow desired, by making it sufficiently large to pass the maximum desired flow when the standpipe stream is at a maximum density consistent with satisfactory operation, i. e. when aeration through pipe 17 is at a minimum allowable value.

The lower end of standpipe 15 connects with line 19 which extends from the top of economizer 4 to the bottom of the main reactor 1. Through line 19 there is introduced into reactor 1 the gas stream necessary to fluidize the mass of reactants. This gas stream and the reactants introduced therein from standpipe 15 are at temperatures substantially lower than the reaction temperature level desired in reactor 1. However, the gas stream and accompanying reactants entering reactor 1 from line 19 are preheated to the desired reaction temperature by the highly turbulent fluidized mass of reactants in reactor 1, which is maintained at the desired reaction temperature level by the exothermic heat of reaction and by a small quantity of fuel introduced through line 14a in a manner similar to the supply of fuel to the carbonate reactor as described above. The exothermic heat of reaction and the requirements of the process as to volume of fluidizing gas and quantity of reactants charged are such that ordinarily the entire heat of reaction is absorbed by the reactants and fluidizing gas introduced from line 19 into reactor 1.

The reaction product is withdrawn continuously from reactor 1 through a standpipe 20, the rate of withdrawal being adjusted to maintain the interface at the desired level and to provide a holding time of reactants in reactor 1 substantially greater than the time necessary to effect the reaction. The hot gases from reactor 1 pass through line 11 to carbonate reactor 2. Line 11 also receives a part of the gases emerging from economizer 4. This serves to reduce the temperature of the gas from reactor 1 to a level more suitable for transmission to reactor 2 and also to supply the extra oxygen necessary to support combustion in reactor 2.

Standpipe 20 is provided with aerating means at 21 and an orifice 22, which coact to provide flow regulation in response to variations in the supply of aeration gas. The outlet of orifice 22 discharges into line 23 through which air for the process is introduced into the bottom of economizer 4. A compressor 24 is provided in line 23 to impose the necessary pressure on the system. The hot product passes downwardly through standpipe 20 into line 23 where it is picked up by the air stream and carried into economizer 4. In economizer 4 the fluidized mass of the product is maintained to permit effective contact between the air and product. The quantity of air introduced into the system through line 23 is regulated by the requirements of carbonate reactor 2 and reactor 1. Since this requires a quantity of air which is greater than the amount necessary to fluidize the reactants in reactor 1 the preheated air emerging from the top of economizer 4 is divided between line 19 which passes to the bottom of reactor 1 and line 25 which connects with line 11.

The partially cooled product is withdrawn from economizer 4 in a fluidized condition through standpipe 26 which is provided with aerating means 27 and a valve 28. This product may, if desired, be passed to a second economizer or other heat saving means. If desired, valve 28 may be replaced or augmented with an orifice as previously described.

The waste gas which passes from the system through line 29 at the top of preheater 3 may be treated for the recovery of solids entrained therein. Suitably this gas is passed through separatory means such as cyclone separators and the solids thus separated are returned to preheater 3. Conveniently such separating means may be placed within preheater 3 and the upper portion thereof in the manner shown diagrammatically in the drawing. A plurality of cyclone separators 30 may be maintained in series, or in parallel, in the upper portion of preheater 3. In the arrangement shown the cyclones are connected by lines 31 to a common header 32 which communicates with line 29. The gas in the upper part of preheater 3 passes into the inlets 33 of cyclones 30, deposits all or a substantial proportion of the entrained solids therein and passes out of the system through lines 31 and 29. The separated solids pass from cyclones 30 through lines 34 to a header 35 from which the returned solids pass downwardly through line 36 to a point substantially below interface 10. A shield 37 may be placed around the lower end of line 36 to minimize the passage of gases into the open end of line 36.

The provision of solids recovery means in combination with preheater 3 is advantageous in that it minimizes for the whole system the loss of solids. Furthermore, preheater 3 represents the only place in the system in which the gas temperature is sufficiently low to make practicable the application of recovery means, such as cyclones. Ordinarily this requires that the temperature be not substantially higher than 1000° F.

The solids which are carried out of reactors 1 and 2 and economizer 4 by entrainment in the gas streams passing overhead are recovered in the succeeding chamber to which the exit gas stream passes. Thus solids carried overhead by entrainment through line 5 are recovered in preheater 3 and returned to reactor 2 through standpipe 9. Also solids entrained in the gas stream in line 11 are recovered in reactor 2 and returned to reactor 1 through standpipe 15. In a similar manner solids carried overhead from economizer 4 through lines 19 and 25 are recovered in reactor 1 and in reactor 2 and returned through standpipes 20 and 15, respectively.

The pressure on the system need be no higher than the pressure necessary to pass the gas stream through the system plus the pressure necessary at 29 to dispose of the waste gas. The pressure at which the air is supplied through line 23 may be in the order of 37 pounds gage which is sufficient to fluidize the solids in the four chambers, pass solids through the system and pass the waste gas out through line 29 at a pressure somewhat above atmospheric.

The temperature in main reactor 1 is maintained at a substantially uniform level within the range of 2000–2650° F. In accordance with a preferred modification of this invention the main reactor is maintained at a temperature below the temperature at which fusion of the solids would occur or in the range of 2000–2450° F. The maximum temperature permissible without substantial fusion is most desirable.

The temperature in carbonate reactor 2 is maintained at the level necessary to effect rapid conversion of the carbonates such as calcium carbonate to corresponding oxides. For this purpose a temperature of approximately 1650° F. is satisfactory although somewhat lower temperatures may be employed.

The temperatures in preheater 3 and economizer 4 have no bearing on the reaction and are governed entirely by considerations of efficiency in heat saving. Examples of such temperatures will be given in the following example.

An example of the operation of the process described above will be given in the following description of the operation of a plant designed and operated to produce 735 tons per day of a Portland cement comprising a mixture of dicalcium silicate, tri-calcium silicate, tri-calcium aluminate and small amounts of iron oxide, magnesia and other minor ingredients. This material is produced from a raw material consisting essentially of silica, alumina and calcium carbonate and ground sufficiently fine that 90% of the powder will pass through a number 100 sieve. Analysis of this powder is as follows:

|  | Weight per cent |
|---|---|
| Silica | 14.0 |
| Alumina and iron oxide | 6.7 |
| Calcium carbonate | 74.8 |
| Magnesium carbonate | 1.2 |
| Combined water | 0.6 |
| Miscellaneous | 2.7 |
| Total | 100.0 |

This powder has a specific heat, in the range of 60–1650° F., of about 0.25 B. t. u. per °F. per pound and has a filling weight of 50 pounds per cubic foot.

The above described feed powder is charged to the system at a temperature of about 60° F. through line 6 at the rate of 95,000 pounds per hour. At the same time 107,000 pounds per hour of gas at 1650° F. is passed through line 5 into preheater 3. The inside diameter of line 5 between line 6 and preheater 3 is dimensioned with respect to the volume of gas passing therethrough to provide a linear velocity in that part of line 5 of approximately 50 feet per second. The resulting dense bed of charged material in the preheater 3 is thus heated to a temperature of about 850° F. and the waste gas is withdrawn through line 29 at about the same temperature. Preheater 3 has an inside diameter of approximately 25 feet and the dense phase maintained therein occupies about half the volume of that chamber or about 7,360 cubic feet. The gas flow corresponds to a maximum superficial velocity of about 1.5 feet per second and an average density in the dense phase of approximately 22 pounds per cubic foot is obtained. The dense phase provides even distribution of gas flow and effects sufficient heat exchange with the waste gas.

The preheated feed powder is withdrawn from preheater 3 through standpipe 9 at the rate of 95,000 pounds per hour. At the same time hot gas from reactor 1 and economizer 4 is passed through line 11 into the bottom of carbonate reactor 2 at the rate of 67,585 pounds per hour and at a temperature of approximately 1600° F. That part of line 11 through which the resulting mixture of powder and gas flow to reactor 2 is dimensioned to provide a velocity of 50 feet per second. Carbonate reactor 2 has an inside diameter of 27 feet and provides a dense phase depth of approximately 15 feet. This occupies about one-half the volume of the carbonate reactor. In carbonate reactor 2 the reaction temperature of 1650° F. is maintained throughout by the introduction of 5,886 pounds per hour of powdered coal. The oxygen necessary to support combustion is contained in the gas introduced through line 11. The resulting intermediate product powder has a filling weight of approximately 60 pounds per cubic foot whereby the average density of the dense phase in carbonate reactor 2 is about 27 pounds per cubic foot. The average holding time for the powder in reactor 2 in accordance with the conditions outlined above is approximately 2.6 hours.

The product of the combustion which takes place in the dense phase of the carbonate reactor, approximately 73,000 pounds per hour, together with the carbon dioxide liberated, approximately 34,000 pounds per hour, are discharged from carbonate reactor 2 through line 5.

The powdered intermediate product is withdrawn from reactor 2 through standpipe 15 at the rate of approximately 61,221 pounds per hour (including 471 pounds per hour of ash). This powder is picked up in line 19 by preheated air from economizer 4 which flows through line 19 at the rate of 26,310 pounds per hour at 1100° F. That part of line 19 through which the resulting mixture passes is dimensioned to provide a linear velocity of 40 feet per second. Reactor 1 is dimensioned to provide an average holding time of approximately three hours. Consequently reactor 1 has an inner diameter of approximately 16 feet and the dense phase is maintained at a height of approximately 27 feet. In order to maintain a reaction temperature of approximately 2350° F. the heat of reaction must be supplemented. For this purpose 750 pounds of powdered coal per hour are charged to reactor 1 in any suitable manner to maintain the reaction temperature at the desired level. The fluidized powder in reactor 1 has an average density in the dense phase of approximately 36 pounds per cubic foot.

The product powder is withdrawn from reactor 1 through standpipe 20 at the rate of approximately 61,281 pounds per hour (including 531 pounds per hour of ash). This material is passed into line 23 at a temperature of about 2350° F. where it is picked up by air which is supplied by compressor 24 at the rate of 66,895 pounds per hour. This air, which is at a temperature of 220° F., and the product powder are contacted sufficiently in economizer 4 to preheat the air to a temperature of 1100° F. For this purpose economizer 4 has an inside diameter of 14.5 and the fluid bed height is maintained at approximately 15 feet. The product powder, at a temperature of 1100° F., is withdrawn through standpipe 26 at the rate of about 735 tons per day. The preheated air is divided at the top of economizer 4 to provide the volume of air required for reactor 1, which flows through line 19, and the remainder is passed through line 25 to line 11 and into admixture with the hot gases from reactor 1. This mixture has a temperature of about 1600° F.

The foregoing operating conditions involve passing the gas stream through the various vessels at a maximum superficial velocity of 1.5 feet per second. Air is introduced through line 23 at a pressure of approximately 37 pounds gage at the exit of compressor 24. As a result of the pressure drop in line 23 the pressure is reduced to 30.5 pounds per square inch in the bottom of economizer 4. The pressure drop caused by the dense bed in economizer 4 reduces the pressure to 25.7 pounds per square inch. The pressure further declines in line 19 to 22.4 pounds per square inch in the bottom of reactor 1. The dense bed of reactants in that chamber reduces the pressure further to about 14.0 pounds per square inch in the top of that vessel. Likewise the pressure is further reduced in line 11 to a pressure of 10.8 pounds per square inch in the bottom of carbonate reactor 2 and this is further reduced to 8.0 pounds in the top of that reactor. In preheater 3 the pressure in the bottom of the vessel is about 4.7 pounds per square inch and at the entrance of cyclones 30 it is about 2.3 pounds per square inch.

The standpipes 9, 15, 20 and 26 are provided to effect transfer of solids from a zone of relatively low pressure in the vessels, in which the entrances of the standpipes are located, to transfer lines at relatively high pressures. This is accomplished by reducing the degree of aeration of the solids in the standpipes whereby the density of the material in the standpipes is greater than the density of the dense bed from which it receives its powder. For example, aeration of standpipe 9 is regulated to produce in the standpipe an average density of about 30 pounds per cubic foot. In addition standpipe 9 is provided with a length such that the pressure in the bottom of the standpipe is sufficient to overcome the pressure drop through valve 13 and provide a residual pressure at the exit of the valve sufficient to prevent the flow of gases upwardly into standpipe 9. For this purpose, in the apparatus described above, standpipe 9 is provided with a length of approximately 68 feet. Similarly the density of the powder in standpipe 15 and the length of the standpipe are regulated to provide a pressure of approximately 25.4 pounds per square inch at the exit of valve 18. This corresponds to a powder density in standpipe 15 of about 35 pounds per cubic foot and a length of the standpipe of about 81 feet. Standpipe 20 is provided with a length of about 40 feet and the density of the product powder therein is regulated at about 35 pounds per cubic foot to provide a pressure at the exit of valve 22 of about 33.5 pounds per square inch.

General interior dimensions only are indicated in the drawing but it is to be understood that extensive insulation is required to reduce radiation losses from the system to a minimum. It will be understood furthermore that the construction of the various vessels is necessarily governed by the operating temperatures. Reactors 1 and 2 are lined with suitable refractory materials to withstand the relatively high temperatures existing in those zones of reaction and it may be desirable also to provide such insulation for economizer 4. Preheater 3 may be constructed of sheet steel but considerable outside insulation is required for this vessel, and the others, to achieve maximum thermal efficiency in the system.

I claim:

1. A method for controlling the flow of powdered solids which includes: downwardly flowing a stream of said solids to form a vertically extended standpipe column; introducing an aerating vapor upwardly through said column of downflowing solids to maintain said column in a turbulent pseudo-liquid state; passing said downflowing stream of solids through a constantly open zone of fixed reduced cross-section at the lower end of said column into a region of substantially lower pressure than the pressure at the lower end of said column; and making all variations in the flow of said solids for substantial periods solely by increasing or reducing the rate of introduction of said aerating vapor to increase or reduce the pressure head across said zone while maintaining said restricted zone at the same reduced cross-section.

2. In a process for contacting powdered solids with a plurality of different gasiform streams in separate first and second contacting zones, which process includes separately passing different gasiform streams upwardly through the mass of said solids in said separate first and second contacting zones at such velocities that the solids in each zone are maintained in a fluidized state and an interface is maintained between a lower dense phase and an upper light phase in each zone, the method for controlling the rate of flow of solids from said first contacting zone to said second contacting zone which includes the steps of: downwardly withdrawing a stream of solids from a level below said interface in the first of said contacting zones, said downflowing stream forming a vertically extended standpipe column of sufficient height and density to develop a pressure at its lower end in excess of that required to transfer solids to said second contacting zone; introducing an aerating vapor upwardly through said column of downflowing solids to maintain said column in a turbulent fluidized state; passing said downflowing stream of solids through a constantly open zone of fixed reduced cross-section at the lower end of said column into a transfer zone region of substantially lower pressure; transferring solids from said transfer zone into said second contacting zone by means of an entraining vapor; and making all variations in the flow of said solids from said first contacting zone to said second contacting zone for substantial periods solely by varying the rate of aeration of said downflowing stream of solids to increase or reduce the pressure head across said zone while maintaining said restricted zone at the same reduced cross-section.

3. A method as claimed in claim 2 in which cements are formed in said first contacting zone and said downflowing solids are at temperatures in excess of 2000° F.

4. In the method for contacting powdered solids with a gasiform fluid in a contact zone which includes, maintaining a dense, fluidized, pseudo-liquid bed of suspended solids in at least the lower portion of said contact zone, continuously introducing said gasiform fluid into the lower portion of said contact zone and passing said gasiform fluid upwardly through said dense, fluidized, pseudo-liquid bed, continuously introducing a stream of powdered solids into said dense, fluidized, pseudo-liquid bed and continuously withdrawing from said dense, fluidized, pseudo-liquid bed a downflowing stream of powdered solids, the method of regulating the downward flow of said last-named stream which comprises, passing said downflowing stream into a constantly open zone of fixed, restricted cross-section, introducing aerating gas into said downflowing stream above said zone of fixed restricted cross-section and varying the rate of flow of solids through said zone for substantial periods solely by varying the rate of introduction of said aerating gas to vary the density of said downflowing stream while maintaining said restricted zone at the same reduced cross-section.

ROBERT PYZEL.

References Cited in the file of this patent

UNITED STATES PATENTS

| Number | Name | Date |
|---|---|---|
| 2,409,707 | Roetheli | Oct. 22, 1946 |
| 2,468,521 | Sweetser et al. | Apr. 26, 1949 |
| 2,469,989 | Pyzel | May 10, 1949 |
| 2,529,366 | Bauer | Nov. 7, 1950 |